(12) United States Patent
Kitano et al.

(10) Patent No.: US 6,827,813 B2
(45) Date of Patent: Dec. 7, 2004

(54) METHOD AND APPARATUS FOR PEELING DISC-SHAPED SUBSTRATES FOR AN OPTICAL DISC COMPOSED OF A PAIR OF LAMINATED DISC-SHAPED SUBSTRATES

(75) Inventors: Ryoko Kitano, Komatsushima (JP); Masami Inouchi, Komatsushima (JP); Mikuni Amo, Komatsushima (JP)

(73) Assignee: Kitano Engineering Co., Ltd., Tokushima-ken (JP)

(*) Notice: Subject to any disclaimer, the term of this patent is extended or adjusted under 35 U.S.C. 154(b) by 135 days.

(21) Appl. No.: 10/111,741

(22) PCT Filed: Aug. 28, 2001

(86) PCT No.: PCT/JP01/07392

§ 371 (c)(1),
(2), (4) Date: Sep. 16, 2002

(87) PCT Pub. No.: WO02/19326

PCT Pub. Date: Mar. 7, 2002

(65) Prior Publication Data

US 2003/0116274 A1 Jun. 26, 2003

(30) Foreign Application Priority Data

Aug. 29, 2000 (JP) ........................................ 2000-259890

(51) Int. Cl.[7] .............................................. B32B 35/00
(52) U.S. Cl. ......................... 156/344; 156/584; 29/239; 29/426.5
(58) Field of Search ................................ 156/344, 584; 29/239, 426.5; 264/36.13

(56) References Cited

U.S. PATENT DOCUMENTS

| | | | |
|---|---|---|---|
| 5,743,965 A | | 4/1998 | Nishimura et al. |
| 5,938,891 A | | 8/1999 | Kashiwagi et al. |
| 5,972,159 A | * | 10/1999 | Uryu et al. .................. 156/344 |
| 6,228,203 B1 | | 5/2001 | Kotoyori et al. |
| 6,478,069 B1 | * | 11/2002 | Fujisaku et al. ............. 156/584 |
| 6,569,259 B1 | * | 5/2003 | Kagawa ........................ 134/37 |

FOREIGN PATENT DOCUMENTS

| | | |
|---|---|---|
| EP | 1 026 677 | 8/2000 |
| JP | 8-180465 | 7/1996 |
| JP | 10-154322 | 6/1998 |
| JP | 10-208316 | 8/1998 |
| JP | 11-203736 | 7/1999 |
| JP | 2000-076651 | 3/2000 |
| JP | 2000-222786 | 8/2000 |
| JP | 2001-014734 | 1/2001 |
| JP | 2001-052378 | 2/2001 |

* cited by examiner

*Primary Examiner*—Mark A. Osele
(74) *Attorney, Agent, or Firm*—Flynn, Thiel, Boutell & Tanis, P.C.

(57) ABSTRACT

A peeling apparatus including a holding table adapted to carry an optical disc composed of upper and lower disc-shaped substrates laminated to each other, a boss disposed centrally of the holding table which allows gas to blow between the disc-shaped substrates, and a suction means peripherally of the holding table to suck pulverized adhesive dust exhausted from the disc-shaped substrates when the two disc-shaped substrates are peeled from one another. The suction means is provided with a suction groove so formed to correspond to the periphery of the two disc-shaped substrates, and the holding table is provided with sucking and holding means for sucking and holding the two disc-shaped substrates.

18 Claims, 3 Drawing Sheets

(A)       (B)

STEP 1

STEP 2

STEP 3

METHOD AND APPARATUS FOR PEELING DISC-SHAPED SUBSTRATES FOR AN OPTICAL DISC COMPOSED OF A PAIR OF LAMINATED DISC-SHAPED SUBSTRATES

BACKGROUND OF THE INVENTION

1. Technical Field

The present invention relates to a method for separating two sheetings, more particularly to a method and an apparatus for separating two disc-shaped substrates from each other, which substrates form an optical disc.

2. Background

Optical discs such as digital video discs (hereinafter referred to as "DVD's") and the like have two disc substrates, wherein a signal is normally applied to only one of the disc substrates.

Notwithstanding, due to the necessity for increasing memory capacity, DVD's having signals applied to both disc substrates have appeared on the market.

Under such circumstances, ways for further increasing memory capacity have been studied.

FIGS. 5A and 5B illustrate an example for increasing capacity, and show a production step of a so called DVD 9 optical disc.

FIG. 5A shows the production step in perspective. FIG. 5B shows the same production step in cross-section.

A mode for carrying out the present invention will be described below in detail. A disc-shaped substrate 100 (first disc-shaped substrate) which includes (polymethacyric acid methyl) PMMA used for trial and a disc-shaped substrate 200 (second disc-shaped substrate) are prepared (step 1).

A data logging display of the disc-shaped substrate 100 composed of PMMA is subjected to sputtering (for instance, metallic coatings such as aluminum and the like are formed thereon). In the same manner, the disc-shaped substrate 200 comprised of polycarbonate is also subjected to sputtering.

These two surfaces that are subjected to sputtering are put together and then laminated or fixed to one another by use of an adhesive R (Step 2).

In this instance, laminating is performed in such a manner that, for instance, two disc-shaped substrates are carried on a rotary table and rotated to develop, as a whole, the adhesive applied between the disc-shaped substrates (normally, UV resin) and then the adhesive is cured (normally this is done through radiation of ultraviolet rays).

In this manner, two disc-shaped substrates 100, 200 are laminated by an adhesive R to form an integrated unit.

Now, the disc-shaped substrates 100, 200 which form the integrated unit are separated from each other.

In other words, the first disc-shaped substrate 100 and the second disc-shaped substrate 200 are pulled apart (Step 3).

In this instance, PMMA, which comprises the first disc-shaped substrate 100, has difficulty adhering to the other material. A portion 101 which has been subjected to sputtering is separated from the PMMA wherein it adheres to the second disc-shaped substrate (specifically, the adhesive R).

The optical disc formed in such a way includes a memoplate but has a great capacity due to the double configuration of signaling sides thereby increasing memory capacity so that it is a so called "DVD 9".

If greater capacity is required of the optical disc, the DVD 9 and the aforementioned second disc-shaped substrate (Specifically, UV Resin) are laminated by the adhesive to the second disc-shaped substrate to form DVD 14.

Among others, the step of peeling the first disc-shaped substrate 100 from the second disc-shaped substrate 200 is very important when quality is determined.

Conventionally, both surfaces of the disc-shaped substrates are sucked and pulled from each other by an adsorbent pad.

Notwithstanding, an extremely great force is required to separate them from each other to afford powerful force. This will necessitate great absorptive force, thereby requiring increased effort.

When separation is made, local force is applied to the portion as sucked which introduces defects through distortion of the disc-shaped substrate.

Further, problems arise from lack of uniformity of a surface as peeled off.

The present invention is provided to solve the aforementioned problems.

It is an object of the invention to provide a method and an apparatus for precisely peeling both of the disc-shaped substrates off by a simple device without requiring any greater separating force.

In view of the aforementioned problems, as a result of concentrated research thereon, such problem has been readily and precisely solved more than as expected by blowing gas between the disc-shaped substrates to separate them.

A first aspect of the invention resides in a method of pulling away upper and lower disc-shaped substrates from each other wherein the upper and lower disc-shaped substrates are laminated by the adhesive, and wherein gas is blown therebetween to peel the substrates away from each other.

A second aspect of the invention resides in the peeling off method wherein pulverized adhesive dust is exhausted from the periphery of the optical disc.

A third aspect of the invention resides in the method wherein gas is blown by a boss member inserted into a center hole in the optical disc.

A fourth aspect of the invention exists in the exfoliating method wherein pulverized adhesive dust is sucked by sucking means mounted on a holding table to suck pulverized adhesive dust.

A fifth aspect of the invention exists in the exfoliating apparatus which comprises a holding table adapted to carry an optical disc composed of upper and lower disc-shaped substrates and a boss provided centrally of the holding table to allow gas to blow between both of the disc-shaped substrates.

A sixth aspect of the invention resides in the exfoliating apparatus comprising suction means peripherally of the holding table to suck pulverized adhesive dust when the two disc-shaped substrates are peeled off from each other.

A seventh aspect of the invention resides in the exfoliating apparatus comprising a suction means which includes a suction groove so formed as to open circumferentially of the two disc-shaped substrates.

An eighth aspect of the invention exists in the exfoliating apparatus wherein the holding table is provided with a circular flange to receive gas exhausted from the circumference of the two disc-shaped substrates.

A ninth aspect of the invention exists in the exfoliating apparatus wherein the holding table is provided with sucking and holding means for sucking and holding the two disc-shaped substrates.

A tenth aspect of the invention resides in the exfoliating apparatus which comprises a holding table adapted to carry an optical disc composed of upper and lower disc-shaped substrates laminated to each other, a boss disposed centrally of the holding table allowing gas to blow between the disc-shaped substrates, and suction means peripherally of the holding table to suck pulverized adhesive dust when the two disc-shaped substrates are peeled off from each other.

The suction means is provided with a suction groove so formed as to correspond to the periphery of the two disc-shaped substrates, the holding table being provided with sucking and holding means for sucking and holding the two disc-shaped substrates.

According to this invention, it is possible to employ an exfoliating or peeling method adopted in combination with more than two arrangements selected from the aforementioned 1~4 and an exfoliating apparatus employed in combination with more than two arrangements selected from the aforementioned 5~10.

According to the exfoliating or peeling apparatus according to this invention, both of the disc-shaped substrates may be suitably separated from each other by simple means.

In accordance with the present invention, the two disc-shaped substrates may be readily and precisely peeled and exfoliated by simply blowing gas therebetween.

Conventionally, the disc-shaped substrates have been subjected to distortion, but never distorted to perform a uniform exfoliation when the latter is made.

Pulverized adhesive dust and the like may be sucked when exfoliation is made so that troublesome matter over mechanical equipment and the like may be eliminated.

DESCRIPTION OF THE PREFERRED EMBODIMENT

A preferred embodiment of the method and the apparatus for peeling off the disc-shaped substrates will be described in more detail in conjunction with the accompanying drawings.

Figure 1:
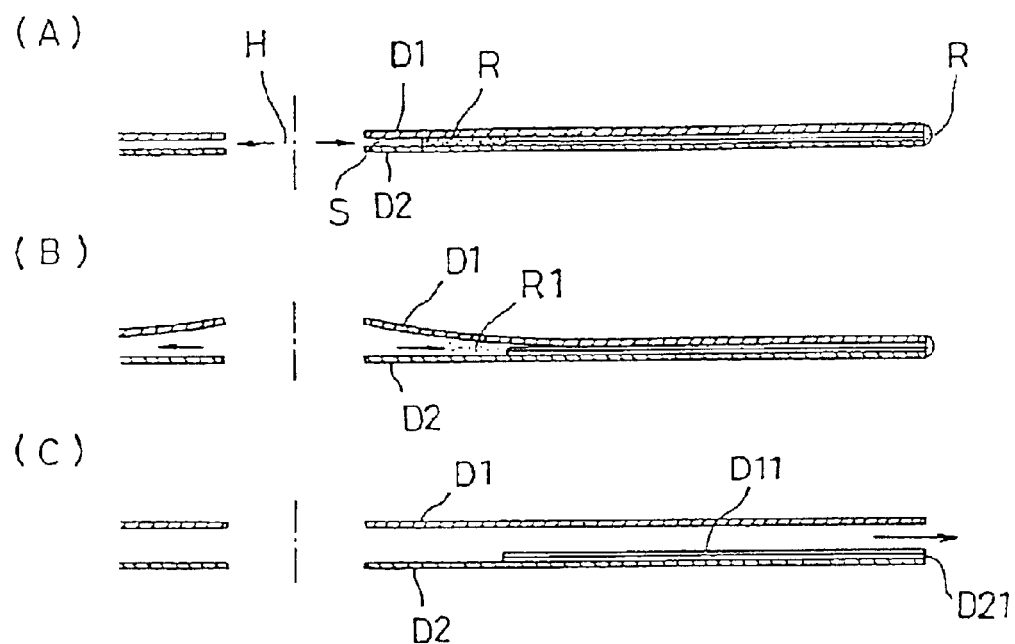
FIGS. 1(A) and 1(B) and 1(C) are conceptual views illustrating a principle process by which the disc-shaped substrates are peeled off.
Figure 2:
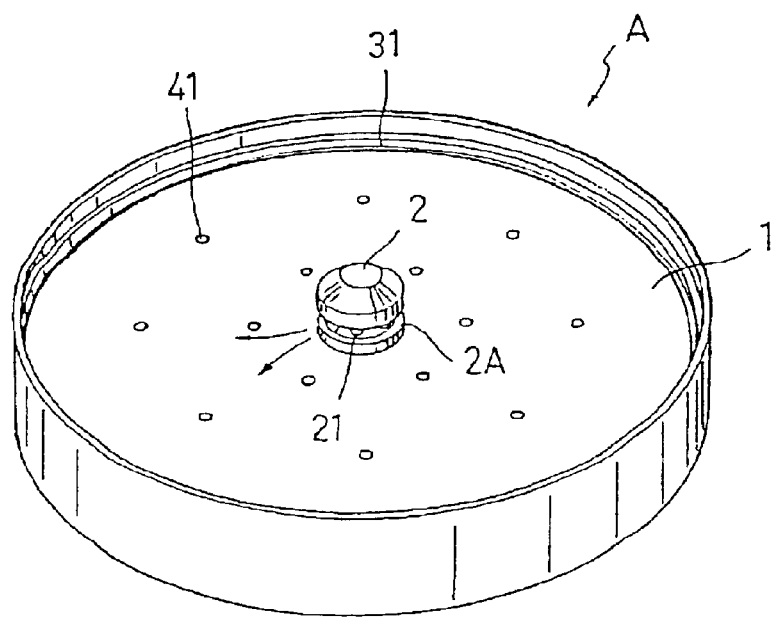
FIG. 2 is a perspective view showing an apparatus for peeling the substrates.
Figure 3:
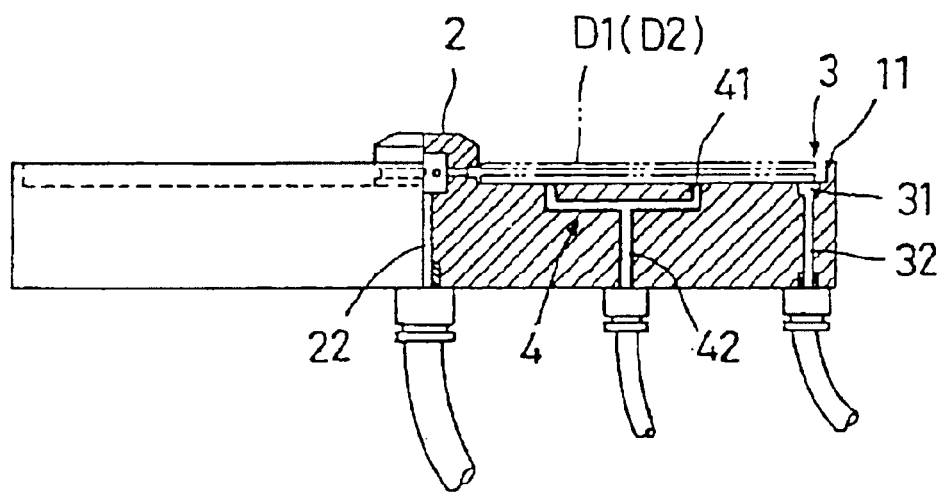
FIG. 3 is a sectional view showing an apparatus for peeling the substrates.
Figure 4:
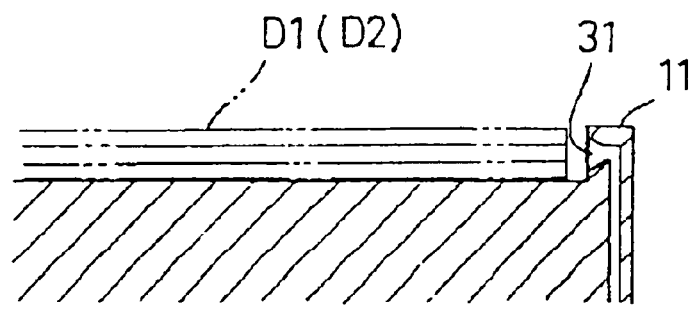
FIG. 4 is a representation of another modification of a blowoff port.
Figure 5:
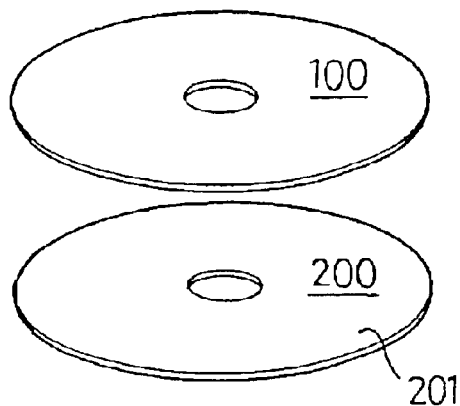
FIGS. 5(A) and 5(B) are explanatory of steps for manufacturing a DVD.
Figure 5:
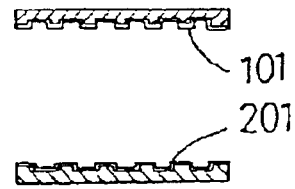
Figure 5:
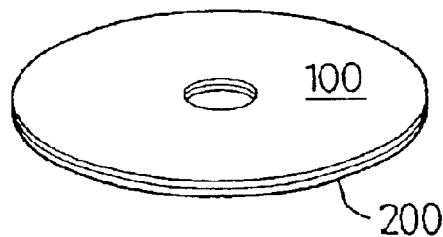
Figure 5:
Figure 5:
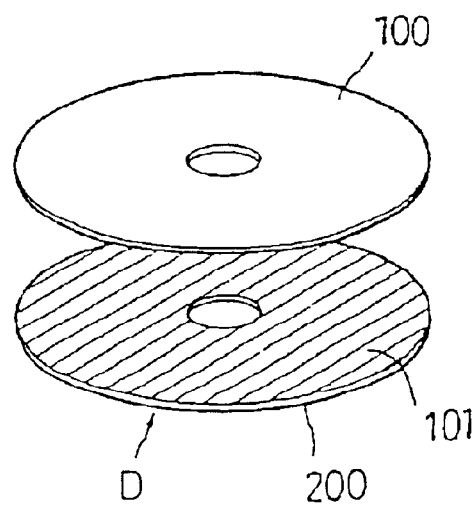
Figure 5:
Figure 5:
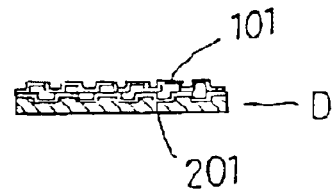

FIG. 1~FIG. 3 are views explanatory of a method and an apparatus for peeling the substrates according to the invention.

Among others, FIG. 1 is a simplified representation showing a process for peeling off the disc-shaped substrates.

The adhesive R is interposed between the two disc-shaped substrates to thereby hold the two disc-shaped substrates D1, D2 together [FIG. 1(A)].

Hence, the upper disc-shaped substrate is, for example, supposed to be made of PMMA (polymethacyric acid methyl) and forms a metallic film D11 subjected to sputtering, whereas the lower disc-shaped substrate is made of polycarbonate and similarly a metallic foil D21.

Gas (for example, air) is blown off from the center hole H outwardly, so that air is blown off into a clearance S between the two disc-shaped substrates [FIG. 1(B)].

Incidentally, the periphery of the two disc-shaped substrates is formed with clearance S since the adhesive is not filled therein. For this reason, an opportunity is given to peel the disc-shaped substrates from one another.

When air is blown into the disc-shaped substrates, the two disc-shaped substrates are peeled off, as shown, under influence of a separating force in up and down directions.

Air as blown thereinto is radially spread from the center hole in the disc-shaped substrates and then exhausted from the periphery thereof so that joined surfaces of the two disc-shaped substrates are peeled from each other all over the surfaces [FIG. 1(C)].

More specifically, the upper disc-shaped substrate D1 and the metal foil D11 are peeled off from each other but the latter is left as adhesive on the lower disc-shaped substrate D2. As such, the upper and lower disc-shaped substrates are separated from each other.

In this manner, both of the disc-shaped substrates are separated by air pressure as blown to make possible peel-off uniform. This will not partially bias peel strength (reparative force) as heretofore has been done.

Prior to peeling, a portion of the inner periphery of either one of the two disc-shaped substrates whose metal foil is not subjected to sputtering, is firmly laminated by the adhesive R to the upper and lower disc-shaped substrates whereas the outer periphery thereof is firmly laminated to the adhesive R.

In this connection, it is noted that when the adhesive is peeled off from the surface of the substrate, adhesive powder dust R1 (inclusive of the other powder dust contained in the adhesive) results from fine crack of the adhesive.

This adhesive powder dust is caused to be exhausted outwardly from the peripheral edge of the disc-shaped substrate accompanied by inflow air.

This exhausted adhesive powder dust R1 is liable to stain the circumference and to enter the mechanical unit to result in trouble. This will require suction and removal of the exhausted adhesive powder dust R1.

In order to carry out the peeling method for the disc-shaped substrate, for example, the peeling apparatus as will be described hereinafter is utilized.

FIG. 2 is a perspective view showing the peeling apparatus, and FIG. 3 is a sectional view showing the peeling apparatus.

The peeling apparatus A is provided with a holding table 1 and a boss 2.

The boss 2 is inserted into a center hole H in the disc-shaped substrate to function as the element for positioning the substrates and blowing air between the two disc-shaped substrates.

Air is blown in by means of a blowoff port 21 formed peripherally of the circular boss 2 which is led through a high tension path 22 to a high tension channel source (not shown) positioned separately thereof.

It is preferable that the blowoff port 21 be formed on the bottom of a recess 2A circumferentially of the boss 2.

The holding table 1 includes suction means 3 adapted for drawing the powder dust R1 of the adhesive as described hereinafter.

The suction means 3 on the holding table 1 is arranged near the periphery thereof and adapted to circumferentially open at the peripheral edge of a suction groove 31 just when the disc-shaped substrates are placed on the holding table 1.

Circular flange 11 is provided on the circumferential edge of the holding table 1 and so preferably arranged as to once impinge the exhausted air thereagainst.

The circular flange 11 acts to prevent the air with the powder dust from forcibly running away outwardly.

In this connection, such powder dust R1 stains the outside thereby causing troubles in surrounding units and mechanisms. For this reason, such troubles or the like should be avoided as much as possible.

A negative pressure source for suction (first negative pressure source) is separately provided via negative channel 32 in communication with the suction groove 31.

The holding table 1 also includes an adsorptive holding means 4 for adsorbing and holding the disc-shaped substrates onto the surface of the holding table, and an adsorptive hole 41 as the adsorptive holding means is in communication with another negative pressure source (not shown) different from the aforementioned negative pressure source (the first negative pressure source) via a negative pressure channel 42. Notwithstanding, it is possible to use the same channel through which the negative pressure for adsorbing and holding the substrates onto the holding table 1 and to suck in powder dust R1 of the adhesive.

Next, the mode of operation by which the disc-shaped substrates are peeled off through the use of such peeler with the aforementioned arrangement will be explained hereafter.

First, the optical disc D is set on the holding table 1. Thus, the center hole H is mounted on the boss 2 of the holding table to present a condition in which it is laid on the table. Then, compressed air is blown out from the boss with the optical disc D being absorbed and held. At this moment, gas (air) is blown into clearance S from blowoff ports 21 between the disc-shaped substrates D1, D2, thereby acting as an upward and downward separative force to cause peeling from the center to the periphery thereof.

When the blowoff air is exhausted from the peripheries of the disc-shaped substrates the peeling has been completed. In this connection, it is noted that the exhausted air from blowoff ports 21 is sucked whereas suction of the powder-dust R1 or the like may be carried out to prevent the latter from scattering over surroundings.

Although the invention has been described, it should be understood that the invention should not be limited to a particular embodiment and that various changes or modifications may be made within the scope or the purport of the appended claims.

For example, it is possible that the suction groove 31 may be formed on the circular flange 11, as shown. Although the suction groove is shown in the form of a continuous slit, intermittent independent openings may be provided. Blowoff gas may not be limited to air but nitrogen gas and the like may be substituted therefore. Further, material for the upper disc-shaped substrate has been described by taking the case of PMMA but may be, of course, employed if it is made of lower adhesive property.

The peeling method according to the invention may be also applicable to the disc-shaped substrates that require peeling for any reason irrespective of the presence of metal film or coating.

Further, adhesives for laminating both the disc-shaped substrates are those such as UV resin, and thermosetting resin.

The peeling principle in accordance with the invention may be applicable not only to the aforementioned DVD but also to the case where sheets are generally laminated with the adhesive.

As above described, although this invention is applied to the technical field which relates to the peeling method for exfoliating the two disc-shaped substrates which form the optical disc to thereby separate same from each other, this invention may be also applicable to a technical field other than the optical disc field which requires peeling sheets laminated by adhesive if the same result may be expected from the latter.

What is claimed is:

1. A method for peeling upper and lower disc-shaped substrates from one another, wherein the upper and lower disc-shaped substrates are laminated by an adhesive to form an optical disc, wherein gas is blown from a center hole defined in said optical disc between said upper and lower disc-shaped substrates to separate same from one another, and wherein an adhesive powder dust is exhausted from the periphery of the substrates.

2. The method of claim 1 wherein the gas is blown by a boss inserted into the center hole of the optical disc.

3. The method of claim 1 wherein the adhesive powder dust is absorbed by suction means disposed on a holding table, which holding table is adapted to hold the optical disc.

4. The method of claim 1 wherein the adhesive powder dust is suctioned from the periphery of the holding table by a suction device to prevent the escape of the adhesive powder dust into the environment.

5. A peeling apparatus comprising a holding table for supporting an optical disc including upper and lower disc-shaped substrates laminated to each other, a boss disposed centrally of said holding table for blowing gas between the disc-shaped substrates, and a suction arrangement disposed peripherally of said holding table for absorbing an adhesive powder dust during peeling of said upper and lower disc-shaped substrates from one another.

6. The peeling apparatus of claim 5 wherein said suction arrangement includes a suction groove which opens toward the periphery of the disc-shaped substrates.

7. The peeling apparatus of claim 6 wherein said suction groove is defined in said holding table and opens sidewardly or upwardly towards the periphery of the disc-shaped substrates, said suction groove communicating with a suction passage defined in said holding table.

8. The peeling apparatus of claim 7 wherein said holding table defines thereon an upwardly projecting flange which is disposed in peripherally surrounding relation with the disc-shaped substrates, said flange being disposed such that the gas which is exhausted from between the disc-shaped substrates impinges against said flange to prevent the escape of adhesive dust.

9. The peeling apparatus of claim 8 wherein said suction groove opens sidewardly through said flange.

10. The peeling apparatus of claim 7 wherein said holding table includes an absorptive holding device for applying suction to and holding the disc-shaped substrates on said holding table.

11. The peeling apparatus of claim 5 wherein said boss projects upwardly from said holding table and into a center hole defined in the optical disc, said boss defining openings therein through which the gas is blown between the disc-shaped substrates.

12. A peeling apparatus comprising a holding table for supporting an optical disc including upper and lower disc-shaped substrates laminated to each other, a boss disposed centrally of said holding table for blowing gas between the disc-shaped substrates, wherein said holding table is formed with a circular flange for receiving gas exhausted from the periphery of the disc-shaped substrates.

13. The peeling apparatus of claim 12 wherein said circular flange projects upwardly from said holding table and is disposed in surrounding relation with the disc-shaped substrates, said flange being disposed such that the gas which is exhausted from between the disc-shaped substrates impinges against said flange to prevent the escape of adhesive dust into the environment.

14. A peeling apparatus comprising a holding table adapted to carry an optical disc composed of upper and lower disc-shaped substrates which are laminated to one another, a boss disposed centrally of said holding table which allows gas to blow between the disc-shaped substrates, and a suction device disposed peripherally of said holding table for sucking pulverized adhesive dust exhausted from the disc-shaped substrates when same are peeled from one another, said suction device including a suction groove formed to correspond to the peripheral ends of the disc-shaped substrates, said holding table including an arrangement which applies suction to and holds the disc-shaped substrates thereon.

15. The peeling apparatus of claim 14 wherein said holding table includes a generally upwardly projecting flange disposed in surrounding relation with the disc-shaped substrates when positioned on said holding table, and said suction groove opens upwardly or sidewardly towards the peripheries of the disc-shaped substrates supported on said holding table.

16. The peeling apparatus of claim 15 wherein part of said suction groove is disposed in said flange and said part opens sidewardly and inwardly towards said boss.

17. The peeling apparatus of claim 15 wherein said suction groove is disposed in said holding table and opens upwardly towards the peripheral edges of the disc-shaped substrates.

18. The peeling arrangement of claim 14 wherein said suction arrangement is disposed between said boss and said suction device.

* * * * *